United States Patent [19]

Sullivan

[11] 4,253,957
[45] Mar. 3, 1981

[54] MARINE SEWAGE DISPOSAL

[75] Inventor: Dennis W. Sullivan, New Iberia, La.

[73] Assignee: Red Fox Industries Inc., New Iberia, La.

[21] Appl. No.: 82,964

[22] Filed: Oct. 9, 1979

[51] Int. Cl.³ .............................................. C02C 1/26
[52] U.S. Cl. ................................. 210/195.3; 210/197; 210/207; 210/218; 210/320; 210/221.2
[58] Field of Search .................... 210/167, 194, 195.1, 210/195.2, 195.3, 196, 197, 205–207, 218, 220, 221 P, 320, 322, 241, 525

[56] References Cited

U.S. PATENT DOCUMENTS

| | | | |
|---|---|---|---|
| 2,348,122 | 5/1944 | Green | 210/198 X |
| 2,413,838 | 1/1947 | Mallory | 210/197 X |
| 2,629,689 | 2/1953 | Green et al. | 210/218 X |
| 2,709,680 | 5/1955 | Watson | 210/2 |
| 2,901,114 | 8/1959 | Smith et al. | 210/200 |
| 2,930,393 | 3/1960 | Starling | 137/205 |
| 3,051,315 | 8/1962 | Boester | 210/220 X |
| 3,204,768 | 9/1965 | Daniel | 210/197 |
| 3,239,438 | 3/1966 | Voorhees | 210/167 X |
| 3,275,149 | 9/1966 | Ludwig et al. | 210/195.3 |
| 3,327,855 | 6/1967 | Watson et al. | 210/108 |
| 3,335,865 | 8/1967 | Cawley et al. | 210/110 |
| 3,347,784 | 10/1967 | Kappe | 210/197 X |
| 3,415,381 | 12/1968 | Thayer | 210/102 |
| 3,419,146 | 12/1968 | Koulovatos | 210/220 X |
| 3,497,064 | 2/1970 | Valdespino | 210/117 |
| 3,535,234 | 10/1970 | Gilwood | 210/7 |
| 3,709,363 | 1/1973 | Smart et al. | 210/197 X |
| 3,733,264 | 5/1973 | Spector et al. | 210/195.3 |
| 3,764,011 | 10/1973 | Owens | 210/197 X |
| 3,870,634 | 3/1975 | Homahrer | 210/220 |
| 3,879,285 | 4/1975 | Yost | 210/220 X |
| 3,951,816 | 4/1976 | Bascode et al. | 210/525 X |
| 3,992,299 | 11/1976 | Wray | 210/220 X |
| 4,104,167 | 8/1978 | Besik | 210/197 X |
| 4,176,068 | 11/1979 | Ankersmit | 210/538 X |

Primary Examiner—John Adee
Attorney, Agent, or Firm—Wilkinson, Mawhinney & Theibault

[57] ABSTRACT

An activated sludge marine sewage disposal apparatus includes an aeration chamber immediately adjacent to a flooded settling tank, rising above a disinfectant chamber and a holding chamber disposed around the lower part of the tank. Flow from the aeration chamber to the settling tank is through a port in the common wall between the aeration chamber and settling tank, and up inside a pond separated from the rest of the tank by a downwardly flaring baffle of skirt depending from the top of the tank. A single shimmer at the center of the area at the top of the pond picks up floating solids and returns them to the top of the aeration chamber. A vent disposed directly over the shimmer continuously draws off air and gas to the aeration chamber. A sludge return line picks up heavy solids for the bottom of the tank and returns them to the top of the aeration chamber through a riser located in the aeration chamber. Liquid in the settling tank flows out through a submerged perforated pipe into a standpipe in the aeration chamber, with is located centrally in the aeration chamber, and overflows through an inverted U tube, vented to the aeration chamber, the tube connecting to a downcomer sending the liquid back through the common wall to the disinfectant compartment. When sufficient volume of fluid accumulates in the disinfectant compartment, it overflows into a holding tank, from which it emerges via a port.

19 Claims, 5 Drawing Figures

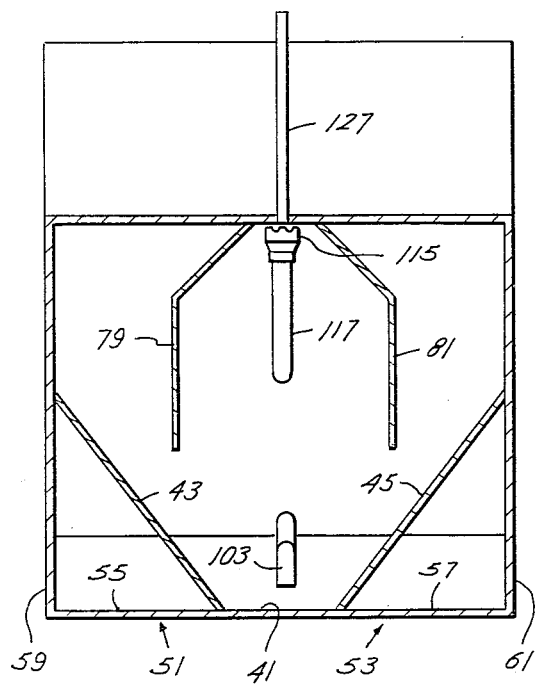
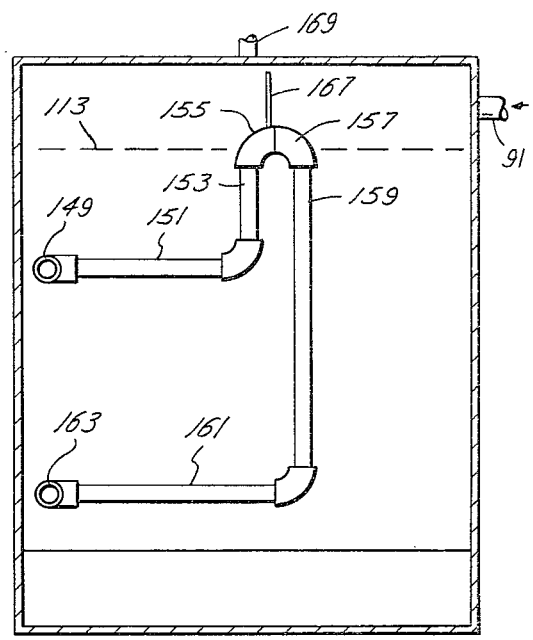
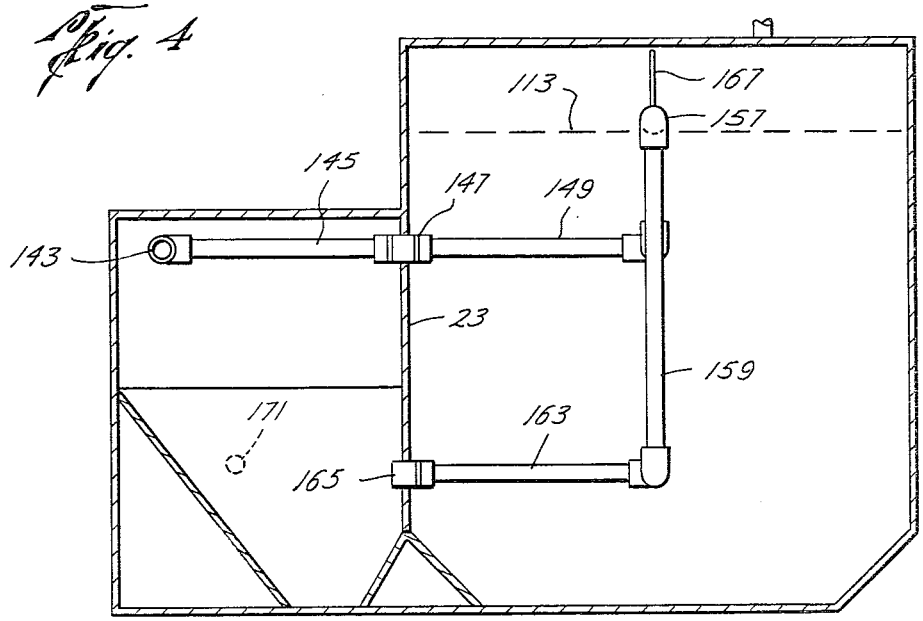

MARINE SEWAGE DISPOSAL

CROSS REFERENCE TO RELATED APPLICATION

This application discloses improvements upon applicant's copending application Ser. No. 746,052, filed Nov. 29, 1976, entitled Sewage Disposal System, the disclosure of which is incorporated herein by reference. The apparatus shown in that application has now been in public use for over a year.

BACKGROUND OF THE INVENTION

This invention relates to an activated sludge sewage disposal system and more particularly to such a system specially adapted for marine use. Reference may be made to the aforementioned application for a discussion of various prior art systems of this nature.

Problems encountered with prior art equipment such as disclosed in the aforementioned patent application, include surging of fluid from the aeration chamber to the settling tank when displacement of fluid in the aeration chamber increases the head of fluid at the standpipe. Such surging may occur when the ship rolls or pitches or both, depending on the location of the sewage disposal apparatus relative to the ship. Surging will tend to carry unmacerated solids into the pond in the settling tank, overloading the skimmer and sludge return.

In the apparatus of the aforementioned patent application, although manually controlled valve means in the top of the settling tank enables all the air in the top of the tank to be vented to atmosphere when the apparatus is first started up and the tank is flooded with effluent from the aeration chamber, during normal operation of the apparatus any gas entrained by the effluent will collect at the top of the pond in the top of the settling tank. The gas may increase in volume to the point where the gas-effluent interface is below the level of the skimmers, rendering the skimmers inactive. Even without lowering of the interface to such an extreme degree, gas at the top of the pond will tend to concentrate over the top of each skimmer and reduce its efficiency.

A further problem with the skimmers of the apparatus of the aforementioned application is the presence of dead areas at the top of the pond where the skimmer action is ineffective to create surface movement sufficient to draw in floating sludge to the skimmer outlet, resulting in the buildup of sludge cake in the top of the pond which ultimately may block the skimmer means from functioning.

SUMMARY OF THE INVENTION

According to the invention, the foregoing difficulties are overcome by placing the standpipe in the center of the aeration chamber so that the head on the standpipe will remain constant despite rolling and pitching of the ship, or other action causing change in the inclination of the aeration chamber.

Vent means, continuously open to the aeration chamber, is disposed immediately over the top of the skimming means, thereby to prevent accumulation of gas in the top of the pond above the skimmer.

The risers for the heavy sludge pickup and for the skimmer return lines are eliminated from the area of the settling tank pond, being placed in the aeration chamber.

The top of the pond is reduced in cross-sectional area and a single skimmer outlet is centrally disposed thereon.

BRIEF DESCRIPTION OF DRAWINGS

For a detailed description of a preferred embodiment of the invention, reference will now be made to the accompanying drawings wherein

FIG. 3 is a back view, partly in section of the apparatus shown in FIGS. 1-3;

FIG. 4 is a vertical section taken on plane 4—4 of FIG. 2;

FIG. 5 is a tranverse vertical section taken at plane 5—5 of FIG. 2.

Figure 1:
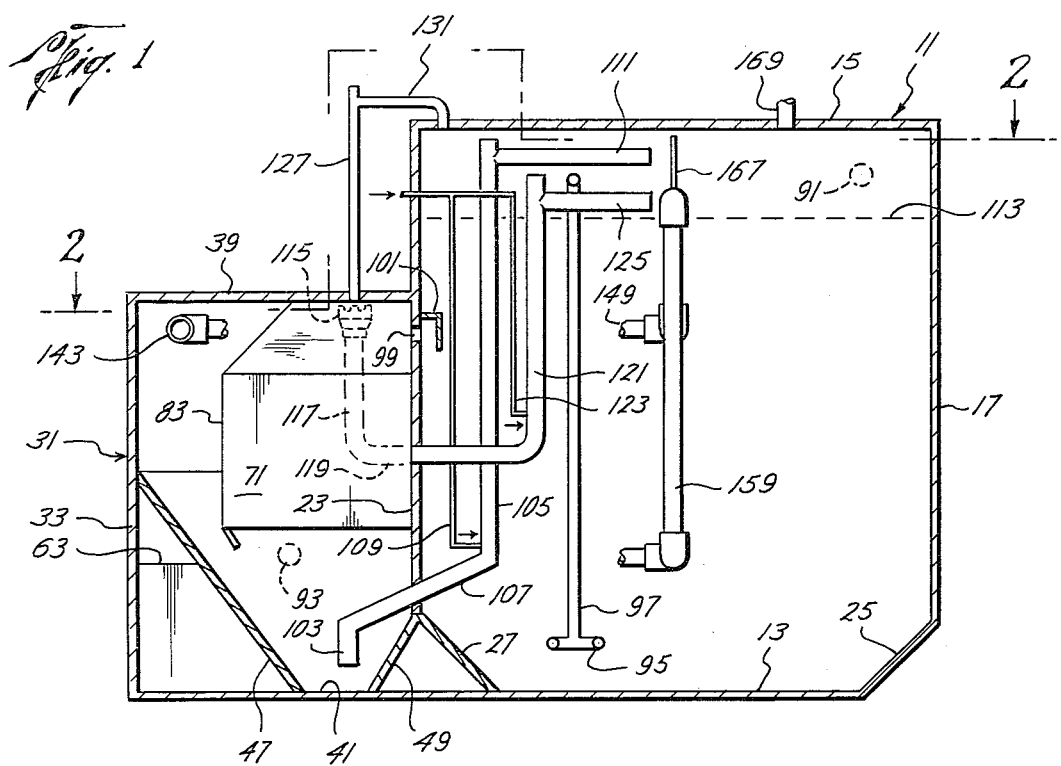
FIG. 1 is medial vertical section through apparatus embodying the invention.

The drawings are to scale, the height of the equipment shown in FIG. 1 being of the order of six feet. The conventions of the U.S. Patent and Trademark Office for patent cases relative to identification of materials have been employed, from which it will be seen that all parts are made of metal, e.g. steel.

DESCRIPTION OF PREFERRED EMBODIMENT

Figure 2:
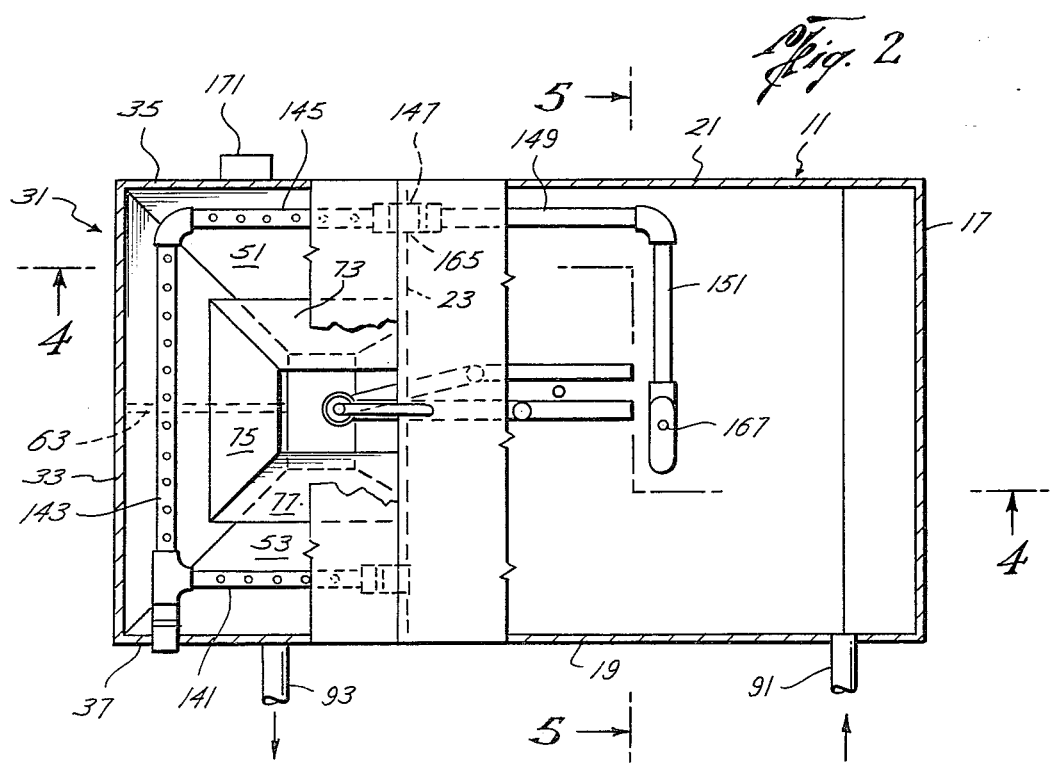
FIG. 2 is a horizontal section taken approximately at plane 2—2 of FIG. 1.

Referring now to FIGS. 1 and 2, there is shown an apparatus for use in the activated sludge process of sewage disposal comprising an aeration chamber 11 having generally the shape of a rectangular parallelepiped with a bottom 13, top 15, front 17, sides 19 and 21, and a backwall 23. Adjacent the bottom are front and back inclined walls 25, 27.

Adjacent to the rear of the aeration chamber is a clarifier or settling tank 31 of rectangular horizontal cross section having a back wall 33 and side walls 35, 37. The front wall of the settling tank is back wall 23 of the aeration chamber, thus being a common wall. Tank 31 has a sealed top 39, a bottom 41 of smaller size than the top, and inclined side, back and front walls 43, 45, 47, 49 (see also FIG. 3).

Adjacent the sloping side walls 43, 45 and underneath the upper portion of the settling tank are disinfectant compartment 51 and holding compartment 53, having bottom walls 55, 57, side walls 59, 61, with a weir 63 between the compartments.

Referring once more to FIGS. 1 and 2, within the settling tank and depending from its top is a skirt, forming a pond 71. The upper part of the skirt has the configuration of a truncated rectangular pyramid, with three top walls 73, 75, 77, having an inclination of at least 45 degrees to the vertical, joining common wall 23 at the front of the pond. Depending from the top walls are three vertical side walls 79, 81, 83 (see FIG. 3) cooperating with common wall 23 to complete the lower part of the skirt. There is thus formed downwardly flaring skirt or baffle means providing a pond whose horizontal cross-section is smaller at its top than its bottom.

The aeration chamber is provided with a sewage inlet 91 (FIG. 2) and the holding compartment is provided with a clear liquid outlet 93. Air is admitted to the bottom of the aeration chamber through diffuser 95 supplied by air line 97 supplied with air from an external source (not shown). The air macerates the solids in the sewage and increases the activity of bacteria in the sewage which break down the solids.

Effluent from the aeration tank passes through common wall 23 via port 99. The port is protected by baffle 101 from the entrance of solids not broken down in the aeration chamber. The effluent initially entering the settling tank is within skirted pond 71. Any dense solids that may have entered through port 99 will have an opportunity to fall out of the effluent to the bottom of the settling tank.

Sludge accumulating in the bottom of the settling tank is removed by sludge pickup pipe 103. Pickup pipe 103 is connected to riser 105 in the aeration chamber by cross-over pipe 107 passing through common wall 23. The sludge is air-lifted by air injected into the riser by air line 109 and is discharged into the top of the aeration chamber by sludge return pipe 111. Pipe 111 discharges above normal sewage level 113.

Low density buoyant solids float to the top of pond 71 adjacent skimmer inlet 115. Inlet 115 is at the upper end of pipe 117, the lower end of which is connected by cross-over pipe 119 passing through common wall 23 to the lower end of riser 121 in the aeration chamber. Slush is air-lifted in riser 121 by air admitted from air line 123. Riser 121 is connected at its upper end to slush return pipe 125. Return pipe 125 discharges into the top of the aeration chamber above normal sewage level 113.

Directly over the top of skimmer inlet 115 is an external vent pipe 127 which is connected by gas return line 131, also external to the rest of the apparatus, to the top of the settling tank, above sewage level 113.

It will therefore be seen that the only piping in pond 71 is that associated with the skimmer. With but a centrally located single skimmer in a pond of unobstructed small top surface area, the skimmer is able to develop enough surface flow to remove substantially all slush from the top of the pond, reducing or eliminating the accumulation of slush cake which would interface with slush flow. The vent above the skimmer, always open to the aeration chamber, continuously removes gas, preventing formation of a gas bubble that could interfere with slush flow.

Although the top of pond 71 is pinched in to be close around the skimmer and eliminate dead spots where there would be no flow induced by the skimmer, the lower part of the pond is of a larger cross section, preventing high velocity flow up into the pond from port 99. Such high velocity flow might cause turbulence and interfere with solids separation in the settling tank.

Referring now particularly to FIGS. 2, 4, 5 liquid is withdrawn from the settling tank through a perforated pipe 141, 143, 145 providing a diffuse outlet in the top of the settling tank. The diffuse outlet or perforated pipe in the settling tank is connected by cross-over pipe 147, extending through common wall 23, with lateral, horizontal pipe 149 in the aeration chamber. Pipe 149 connects to transverse horizontal pipe 151 which is connected to the lower end of standpipe 153. Standpipe 153 determines the level of sewage 113 in the aeration chamber. When the sewage level rises above normal level 113, which is the height of the top of standpipe 153, the sludge flows into the settling tank and then overflows standpipe 153 via elbows 155, 157 into downcomer 159. The lower end of downcomer 159 is connected by transverse horizontal pipe 161 to lateral horizontal pipe 163 which discharges via port 165 in common wall 23 into chlorination compartment 51 (see FIG. 4). To prevent siphoning, the top of the inverted U tube formed by elbows 155, 157 is vented to the aeration chamber by vent pipe 167. The aeration chamber is vented to atmosphere (constantly or under control of a manual valve not shown) through pipe 169 (FIG. 1).

Referring to FIG. 5, the point of connection between elbows 155, 157 actually defines the highest point liquid can rise from standpipe 159 before overflowing, and hence defines the sewage level 113 in the aeration chamber. This point of connection, coincident with vent pipe 167 (refer now to FIG. 2) is located at the center of the liquid surface of the sewage in the aeration chamber. Therefore, inclination of the chamber will not affect the level at the point of connection, and rolling and pitching of the ship or other vessel carrying the sewage disposal apparatus will not cause surging, i.e. alternate cessation of flow through port 23 followed by excessive flow and consequent carry-through of unmacerated, undigested solids from the aeration chamber into the settling tank and premature flow from the settling tank into the chlorination compartment.

Sodium hypochloriate is fed into the disinfectant compartment by an injection pump 171 in sufficient quantity in relation to the volume of the compartment to provide for x minutes of chlorine concentration of the desired value, e.g. y ppm, even when flow is z times average rate. The values of x, y and z are chosen to assure destruction of most pathogenic life forms in the liquid effluent.

When liquid level in disinfectant compartment 51 (see FIG. 2) reaches the level of weir 63, the liquid overflows into holding compartment 53. The treated liquid is withdrawn via outlet 93 by gravity or by a pump (not shown).

While a preferred embodiment of the invention has been shown and described, modifications thereof can be made by one skilled in the art without departing from the spirit of the invention.

I claim:
1. Sewage disposal apparatus comprising
an aeration chamber having an inlet,
a settling tank adjacent said aeration chamber and having a common wall therewith,
said settling tank having a closed top at a lower level than the top of said chamber,
a port in said common wall,
baffle means extending from said wall on opposite sides of said port separating a portion of the interior of said tank providing a pond,
a slush skimmer suction nozzle having its inlet at the top of the pond,
a sludge suction nozzle adjacent the bottom of the tank,
a distributed outlet located at the interior of said tank outside said pond,
first pipe means including a downcomer pipe connected at its upper end to said suction nozzle and at its lower end to a first cross-over pipe extending through said common wall and a first riser connected at its lower end to said cross-over pipe and its upper end to a slush discharge pipe,
second pipe means including a second cross-over pipe extending through said common wall connected to said sludge suction nozzle and a second riser connected at its lower end to said second cross-over pipe and at its upper end to a sludge discharge pipe,
third pipe means including a third cross-over pipe extending through said common wall connected to said distributed outlet and a standpipe connected at its lower end to said third cross-over pipe and at its upper end to a downcomer discharging to a disinfectant chamber, said first and second risers and standpipe and downcomer being located in said aeration chamber.

2. Apparatus according to claim 1,
the peak of the connection between the standpipe and downcomer being located near the center of the upper part of the aeration chamber.

3. Apparatus according to claim 1 or 2
said baffle means being pinched in at its top providing the pond with a smaller top than bottom, said skimmer being located near the center of the top of the pond.

4. Apparatus according to claim 3,
including a vent pipe located directly above said skimmer suction nozzle.

5. Apparatus according to claim 1 or 2,
said connection between the standpipe and downcomer being vented to the aeration chamber.

6. Sewage disposal apparatus comprising
an aeration chamber having a sewage inlet,
a settling tank having a closed top so that it can operate flooded with a certain head,
the top of said aeration chamber being higher than said top of the settling tank so that the sewage level in the aeration chamber can be higher than the top of the settling tank to create such a head,
said settling tank having an influent inlet being connected to said aeration chamber at a level below the top of the settling tank,
said settling tank having an outlet,
baffle means separating a pond in said settling tank from the rest of the tank,
said settling tank having an inlet to said pond,
skimmer means having an inlet at the top of said pond,
said baffle means having a smaller horizontal cross-sectional area at its top adjacent the skimmer inlet than at a lower level adjacent said settling tank inlet.

7. A sewage disposal apparatus as claimed in claim 6 further comprising
piping means connecting said settling tank with a chlorination chamber,
said piping means having an elbow above the liquid level of said aeration chamber and a vent line extending off said elbow, said vent line being substantially in the geometric center of said aeration chamber above the highest level of liquid in said aeration chamber to avoid siphoning of liquid from said settling tank to said chlorination chamber.

8. A sewage disposal apparatus as claimed in claim 6 further comprising
a sludge suction nozzle adjacent the bottom of the tank,
a distributed outlet located at the interior of said tank outside said pond,
first pipe means including a downcomer pipe connected at its upper end to said suction nozzle and at its lower end to a first cross-over pipe extending through said common wall and a first riser connected at its lower end to said cross-over pipe and its upper end to a slush discharge pipe,
second pipe means including a second cross-over pipe extending through said common wall connected to said sludge suction nozzle and a second riser connected at its lower end to said second cross-over pipe and at its upper end to a sludge discharge pipe,
third pipe means including a third cross-over pipe extending through said common wall connected to said distrubted outlet and a standpipe connected at its lower end to said third cross-over pipe and at its upper end to a downcomer discharging to a disinfectant chamber,
said first and second risers and standpipe and downcomer being located in said aeration chamber.

9. Apparatus according to claim 8, the peak of the connection between the standpipe and downcomer being located near the center of the upper part of the aeration chamber.

10. Apparatus according to claim 8 or 9, wherein said baffle means is pinched in at its top providing the pond with a smaller top than bottom, said skimmer being located near the center of the top of the pond.

11. Apparatus according to claim 8 further comprising a vent pipe located directly above said skimmer suction nozzle.

12. Apparatus according to claim 8 or 9, wherein said connection between the standpipe and downcomer is vented to the aeration chamber.

13. Apparatus according to claim 6, wherein the upper part of said standpipe means is vented to said aeration chamber.

14. Apparatus according to claim 6, wherein said settling tank has a baffle means therein defining a pond, said skimmer means inlet being near the center of said pond, said pond having a smaller cross-sectional area at the top thereof than at the bottom thereof.

15. Apparatus according to claim 6, wherein said apparatus includes skimmer means having an inlet at the top of said settling tank, said settling tank having a vent above said skimmer communication with said aeration chamber.

16. Apparatus according to claim 15, wherein said apparatus includes a baffle means in said settling tank defining a pond, and said baffle means includes an upper portion of inverted truncated pyramidal shape.

17. Apparatus according to claim 16, the lower portion of said baffle means having vertical sides.

18. Apparatus according to claim 8, wherein said settling tank has a vent in its top directly above said skimmer means inlet.

19. Sewage disposal apparatus comprising
an aeration chamber having a sewage inlet,
a settling tank having a closed top so that it can operate flooded with a certain head,
the top of said aeration chamber being higher than said top of the settling tank so that the sewage level in the aeration chamber can be higher than the top of the settling tank to create such a head,
said settling tank having an influent inlet being connected to said aeration chamber at a level below the top of the settling tank,
said settling tank having an outlet,
a chlorination chamber in said settling tank, and
piping means connecting said settling tank with said chlorination chamber,
said piping means having an elbow above the liquid level of said aeration chamber and a vent line extending off said elbow, said vent line being substantially in the geometric center of said aeration chamber above the highest level of liquid in said aeration chamber to avoid siphoning of liquid from said settling tank to said chlorination chamber.

* * * * *